United States Patent
Corbit et al.

(10) Patent No.: US 12,214,435 B2
(45) Date of Patent: *Feb. 4, 2025

(54) BOTTOMING TAP AND CHASER AND METHOD OF USE

(71) Applicants: Devin Corbit, Richmond, TX (US); Damon Kuhn, Needville, TX (US)

(72) Inventors: Devin Corbit, Richmond, TX (US); Damon Kuhn, Needville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,102

(22) Filed: Apr. 3, 2023

(65) Prior Publication Data
US 2023/0234151 A1    Jul. 27, 2023

Related U.S. Application Data

(63) Continuation of application No. 15/929,848, filed on May 26, 2020, now Pat. No. 11,618,092.

(60) Provisional application No. 62/966,357, filed on Jan. 27, 2020.

(51) Int. Cl.
*B23G 5/06*    (2006.01)
(52) U.S. Cl.
CPC ............ *B23G 5/06* (2013.01); *B23G 2200/48* (2013.01)
(58) Field of Classification Search
CPC ........ B23G 5/00; B23G 5/06; B23G 2200/34; B23G 2200/46; B23G 2200/48; B23B 2231/0208; Y10T 408/9048
See application file for complete search history.

(56) References Cited

U.S. PATENT DOCUMENTS

| | | |
|---|---|---|
| 1,093,331 A | 4/1914 | Jaques |
| 4,111,442 A | 9/1978 | Wawrzynia |
| 4,412,764 A | 11/1983 | Wawrzyniak |
| 4,708,542 A | 11/1987 | Emanuelli |
| 4,856,946 A | 8/1989 | Park |
| 5,160,225 A | 11/1992 | Chern |
| D378,052 S | 2/1997 | Perreault |

(Continued)

FOREIGN PATENT DOCUMENTS

| | | |
|---|---|---|
| DE | 102020007044 A1 * | 5/2022 |
| EP | 2511541 | 10/2014 |

(Continued)

OTHER PUBLICATIONS

"JTC Spark Plug Hole Thread Chaser. JTC Tools # 1618" available at https://www.ebay.com/itm/JTC-Spark-Plug-Hole-Thread-Chaser-JTC-Tools-1618-/183131189857 (last accessed Jul. 22, 2019).

(Continued)

*Primary Examiner* — Eric A. Gates
(74) *Attorney, Agent, or Firm* — Schultz & Associates, P.C.

(57) ABSTRACT

A tap and chaser are provided each having a cylindrical tool receiver connected to a threading section by a shaft. The receiver and shaft are of diameters sufficiently small to enter the bore hole and distribute any off axis load onto a number of internal threads of the bore hole to dissipate loading. The threaded section includes a group of longitudinal flutes. Each of the lands of the threaded section includes a novel cutting face, tooth angle and rake angle to advantageously allow for threading deep blind holes.

17 Claims, 10 Drawing Sheets

(56) References Cited

U.S. PATENT DOCUMENTS

| | | |
|---|---|---|
| 6,244,142 B1 | 6/2001 | Swanson |
| D462,895 S | 9/2002 | Gaudron |
| 6,499,920 B2 | 12/2002 | Sawabe |
| 7,144,208 B2 * | 12/2006 | Henderer ................ B23P 15/52 |
| | | 76/115 |
| 7,150,588 B2 | 12/2006 | Hakansson |
| D605,933 S | 12/2009 | Gaudron |
| 7,736,100 B2 | 6/2010 | Evans |
| D642,900 S | 8/2011 | McDuff et al. |
| 8,052,360 B2 | 11/2011 | Strom |
| D666,901 S | 9/2012 | Surjan |
| D669,772 S | 10/2012 | Fox |
| 8,844,941 B1 | 9/2014 | Dickrede |
| 8,931,980 B2 | 1/2015 | Knecht |
| 8,944,728 B2 | 2/2015 | Vokel |
| 9,227,256 B2 | 1/2016 | Emerson |
| D792,549 S | 7/2017 | McKillips |
| 9,962,784 B2 | 5/2018 | Bohm |
| D828,148 S | 9/2018 | Camilleri |
| D830,820 S | 10/2018 | Sweeney |
| D831,475 S | 10/2018 | Sweeney et al. |
| D843,825 S | 3/2019 | Wang |
| 10,245,665 B2 | 4/2019 | Woods |
| D848,251 S | 5/2019 | Wang |
| D853,830 S | 7/2019 | Wang |
| D863,050 S | 10/2019 | Chao |
| D879,598 S | 3/2020 | Pring |
| D882,385 S | 4/2020 | Tjerrild |
| D885,874 S | 6/2020 | Hsiao |
| D887,259 S | 6/2020 | Schwarzmann et al. |
| D892,604 S | 8/2020 | Tsai |
| D895,411 S | 9/2020 | Camilleri et al. |
| D899,238 S | 10/2020 | Scott et al. |
| 11,618,092 B2 * | 4/2023 | Corbit ..................... B23G 5/06 |
| | | 408/222 |
| 2007/0082746 A1 | 4/2007 | Rigdon |
| 2012/0243953 A1 | 9/2012 | Orberndorfer |
| 2015/0023749 A1 | 1/2015 | Wheatley |
| 2015/0158101 A1 | 6/2015 | Evans |
| 2019/0176255 A1 | 6/2019 | Kopton |

FOREIGN PATENT DOCUMENTS

| | | |
|---|---|---|
| WO | WO 2007090600 | 8/2007 |
| WO | WO 2019130142 | 7/2019 |

OTHER PUBLICATIONS

"ABN Oxygen Sensor Thread Chaser, M18 × 1.5 Oxygen Sensor Socket Rethread Tool" available at https://www.ebay.com/itm/ABN-Oxygen-Sensor-Thread-Chaser-M18-x-1-5-Oxygen-Sensor-Socket-Rethread-Tool-/231779043341 (last accessed Jul. 22, 2019).

\* cited by examiner

BOTTOMING TAP AND CHASER AND METHOD OF USE

CROSS-REFERENCE TO RELATED APPLICATIONS

This application is a continuation of U.S. application Ser. No. 15/929,848 filed on May 26, 2020, now U.S. Pat. No. 11,618,092 granted on Apr. 4, 2023, which claims priority benefit from U.S. Provisional Application No. 62/966,357 filed on Jan. 27, 2020. The patent applications identified above are incorporated here by reference in their entirety to provide continuity of disclosure.

FIELD OF THE INVENTION

The present invention relates to thread taps and chasers, more specifically to a taps and chasers designed to operate in blind holes.

BACKGROUND OF THE INVENTION

A typical tap of the prior art is used to create threads within a hole or bore. A typical chaser of the prior art is used to restore or clean threads that have been damaged or filled with debris.

Taps and chasers are sometimes required to be used in blind holes that are deeper than the length of the tool. Deep blind holes create a problem in the art because they require many taps and chasers of different lengths to be maintained for the same diameter hole. Maintaining multiple taps and chasers of varying lengths for each size hole is expensive and cumbersome.

Another problem with the prior art is tool misalignment. Proper threading or cleaning requires coaxial alignment between the tool and the hole. But, in a deep blind hole, a long tool places the driver a good distance away from the hole at the start of the tapping or cleaning process. This distance often results in a loss of alignment between the tap and the hole increasing the risk of cross-threading.

Further, long tools require a large clearance distance between the driver and the work piece which severely limits the places where they can be used. As a result, the workpiece must often be removed from a larger assembly to be tapped or cleaned, thereby creating delay in the tapping or cleaning process.

Yet another problem in tapping and cleaning deep blind holes is debris. Debris build-up is greater in a blind hole simply because it is closed-ended. The problem is exacerbated in deep blind hole. Debris build-up lessens thread precision and can cause the tool to bind. As a result, prior art long tools must be removed multiple times while tapping or cleaning a blind hole to remove debris. Removing the tool multiple times increases the risk of cross-threading and increases tapping and cleaning time.

The prior art has attempted several solutions to the existing problems in tapping and cleaning deep blind holes. However, none of them is optimal.

For example, U.S. Pat. No. 8,052,360 to Strom discloses a "self-aligning" tap used to produce correctly aligned threads in an existing smooth bore hole. The flat end of the tap contains a removable pilot. The removable pilot aligns the tap to the axis of the bore. However, the pilot precedes the tap into the bore and so fails to align the shank of the tap. Further, the tap requires a standard t-handle type driver which prevents the tap from being used in deep blind holes.

Similarly, U.S. Pat. No. 9,962,784 to Böhm discloses a thread forming tool having a clamping shank and an axially oriented cooling channel extending between pressing lobes and the clamping shank. The width of the cooling channel increases from the camphor in the direction of the clamping shank. However, the clamping shank is disclosed as having a diameter greater than the hole diameter which prevents use in deep blind holes. Further, the clamping shank is disclosed as terminating in a tool holder in the form of a polygon or a square designed to mate only with a standard t-handle tap driver which will not permit the tool to enter the bore hole.

Likewise, U.S. Pat. No. 7,736,100 to Evans discloses a thread tap adapter for use with a standard thread tap having a square profile driving end. The thread tap adapter includes an outer surface having a hexagonal profile which may be engaged with a wrench and an inner surface having a square profile that engages a driving end of a standard thread tap. However, the adapter is of a diameter substantially larger than bore hole which prevents it from entering the bore hole.

SUMMARY OF THE INVENTION

The taps and chasers disclosed provide a receiver and a threading section connected by an integrally formed shaft. In each case, the receiver is cylindrical, having a diameter equal to or slightly less than the tool root diameter and the diameter of the thread crest of the threads in the bore hole. The reduced diameter of the receiver allows the tool to enter holes deeper than the length of the tap because the receiver can enter the hole. Further, the cylindrical shape of the receiver serves to align the tool exactly in the bore hole during use by distributing the contact surface of the receiver along many of the bore hole threads. Also, extensions can be added to the receiver to allow for greater reach, thereby eliminating the problem of maintaining different length taps and chasers for different depths of holes and the problem of misalignment due to long tap length. The relatively short overall length of the tool also offers the advantage of use in confined spaces.

The taps and chasers disclosed also provide novel combinations of helix angle, lead taper angle, hook angle and rake angle so as to maximize process efficiency thread precision for given materials.

Each receiver further includes a drive socket. The drive socket preferably has a square cross-section. The drive socket allows standard ratchet drivers and readily available socket extensions to be used. Use of a standard ratchet greatly reduces the clearance needed to use the tap or chaser. Likewise, the use of extensions greatly increases the reach of the tap or chaser.

The threading section includes spiral flutes with a novel angle of attack and a novel land cross-section. The lands allow for chips and debris to be very efficiently removed from the cutting surface of the threads during use. Efficient removal of chips and debris prevents the interference with the cutting threads and improves thread precision.

Those skilled in the art will appreciate these mentioned features and advantages of the disclosure together with other important aspects upon reading the detailed description that follows in conjunction with the drawings provided.

BRIEF DESCRIPTION OF THE DRAWINGS

In the detailed description of the preferred embodiments presented below, reference is made to the accompanying drawings.

DETAILED DESCRIPTION OF THE INVENTION

In the description that follows, like parts are marked throughout the specification and figures with the same numerals, respectively. The figures are not necessarily drawn to scale and may be shown in exaggerated or generalized form in the interest of clarity and conciseness.

Figure 1A:
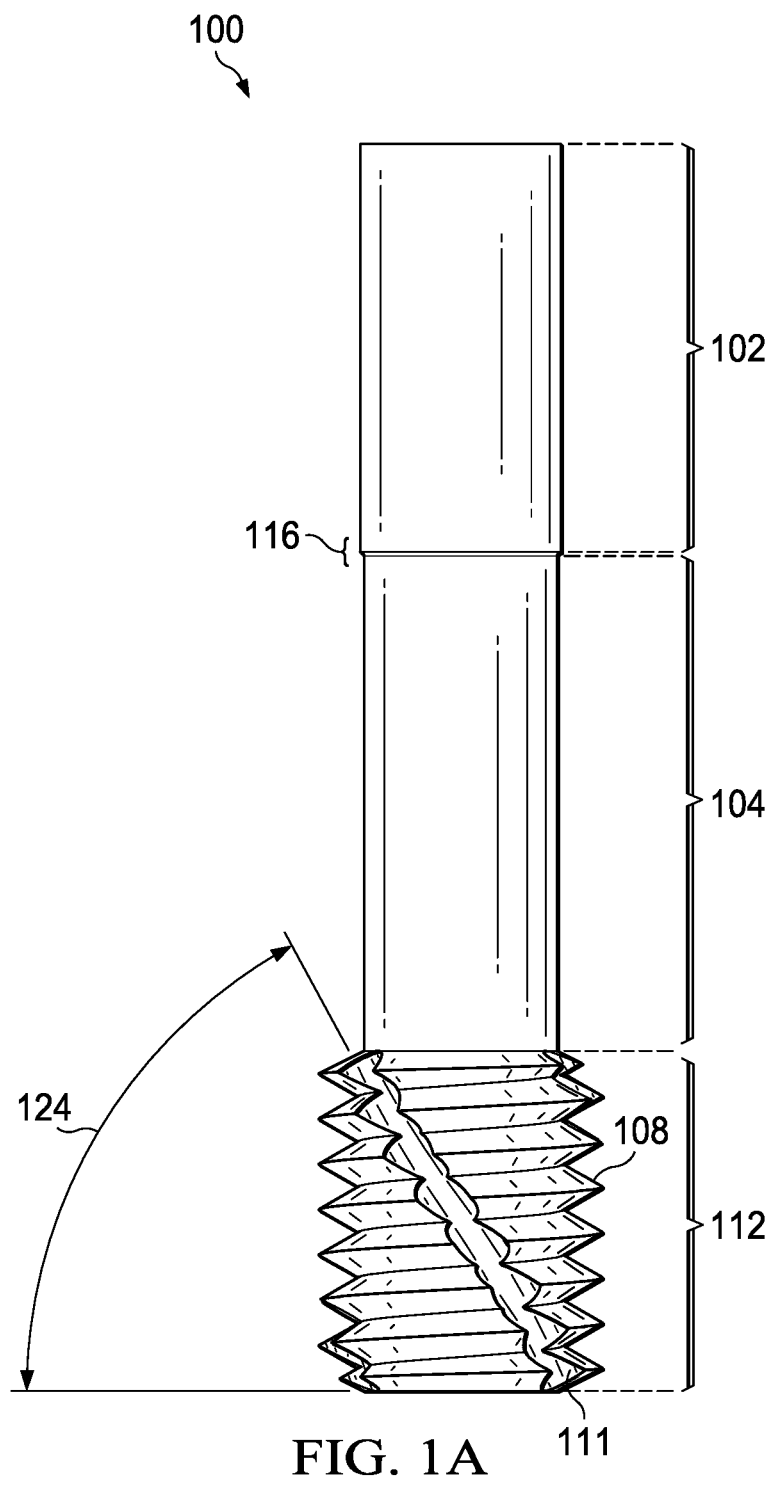
FIG. 1A is a side view of a chaser of a preferred embodiment.

Referring to FIG. 1A, chaser 100 will be described. Chaser 100 is designed to clean, reform and restore existing threads in a blind hole. Using a chaser tap is especially important when dealing with critical torque load threaded holes such as cylinder head bolts in an engine block deck.

Chaser 100 includes receiver 102, frustroconical section 116, shaft 104 and threading section 112. In a preferred embodiment, receiver 102, frustroconical section 116, shaft 104 and threading section 112 are integrally formed.

Receiver 102 is generally cylindrical. In a preferred embodiment, receiver 102 is approximately 0.6" long and about 0.4" in diameter, but other diameters for different sized threads may of course be used. The receiver has a circular cross-section. Preferably the diameter of the circular cross-section is about 3% less than the root diameter of the threading section. However, in other embodiments the diameter of the circular cross-section may be between about 2% and 20% less than the root diameter of the threading section±5%. The circular cross-section and long cylindrical shape are adapted to fit within the bore hole within a reasonably tight set of tolerances in order to guide the shank of the tool into close axial alignment with the hole during use. The surface of the receiver is designed to engage many of the threads of the bore hole simultaneously so as to distribute any potential off-axis loading among many threads to avoid thread distortion and avoid the tool binding with the threads in the bore hole during use.

Frustroconical section 116 extends from receiver 102 to shaft 104. In a preferred embodiment, frustroconical section 116 allows for a gentle, approximately 45°, transition in diameter between receiver 102 and shaft 104. A more gentle transition can be achieved with an approximately 60° transition. The frustroconical section is important because it gently corrects the alignment of the tool as the receiver enters the bore hole during use.

Shaft 104 is located between frustroconical section 116 and threading section 112. Shaft 104 is cylindrical in the preferred embodiment having a length of about 0.7" and a diameter of about 0.3". However, in alternative embodiments, the cross-section of the shaft can be hexagonal or square. In the preferred embodiment, the diameter of the shaft is always smaller than the diameter of the receiver, so as not to interfere with the tool alignment function of the receiver or the removal of debris by the flutes when the tool is in use. In other embodiments, the shaft and the receiver are of the same diameter. Of course, other diameters be employed.

Threading section 112 is connected to shaft 104. Threading section 112 includes cleaning threads 108. Cleaning threads 108 are preferably blunt ended and without taper. The threads have a root diameter and a crest diameter, as will be further described. The blunt ended profile is provided to prevent unwanted removal of thread material from a threaded bore hole. In this embodiment, the threading section is about 0.5" in length. The length of the threading section may be different to accommodate different tapping conditions.

Threading section 112 further comprises spiral flutes 111. In the preferred embodiment, there are three spiral flutes. In other embodiments, the number of spiral flutes can range from one to six.

The spiral flutes, in one embodiment, extend at a novel reverse diagonal helix through the cleaning threads at helix angle 124. A reverse helix angle is a helix angle that runs counter to the threads. If the threads of the threading section are right-handed, then the reverse helix angle is left-handed. If the threads of the threading section are left-handed, then the reverse helix angle is right-handed. In this embodiment, helix angle 124 is 60°, ±2° from the radial axis. Each of the spiral flutes is preferably of a cross-sectional diameter of about 30% of the root diameter. However, the cross-section diameter can range between 25% and 40% of the root diameter. The reverse diagonal helix arrangement is particularly useful in cleaning deep blind holes fouled by carbon scoring or oxidation typical of engine blocks. It has been discovered that the reverse diagonal helix breaks the debris into extremely small pieces which aids in removal by a tapping lubricant. In the preferred embodiment, the helix angle is between 5° and 120°, ±5° from the radial axis. Further, in the preferred embodiment, the spiral flutes all have the same helix angle. However, the helix angle of the spiral flutes does not necessarily need to be the same.

In the preferred embodiment, the ratio of the length of receiver 102 to the length of shaft 104 to the length of threading section 112 is about 1:1.1:0.9. Other preferable ratios include 1:2:1±10% and 1:0.5:1±10%. The preferred length of the chaser is about 1.8" to 2". The ratios are important to the function of the receiver in axially aligning the tool during use. Other lengths and ratios can be used so long as the threading section and the receiver are about the same length.

The chaser is preferably integrally formed from case hardened carbon alloy steel having components of tungsten, chromium, vanadium, molybdenum and nickel with a carbon content of between 0.5% and 1.5%. HRC 58-60 hardness is preferred. In one embodiment, 4340 steel is preferred. In other embodiments, T1, T15, M2 or M48 is preferred. Oil quench is preferred.

Figure 1B:
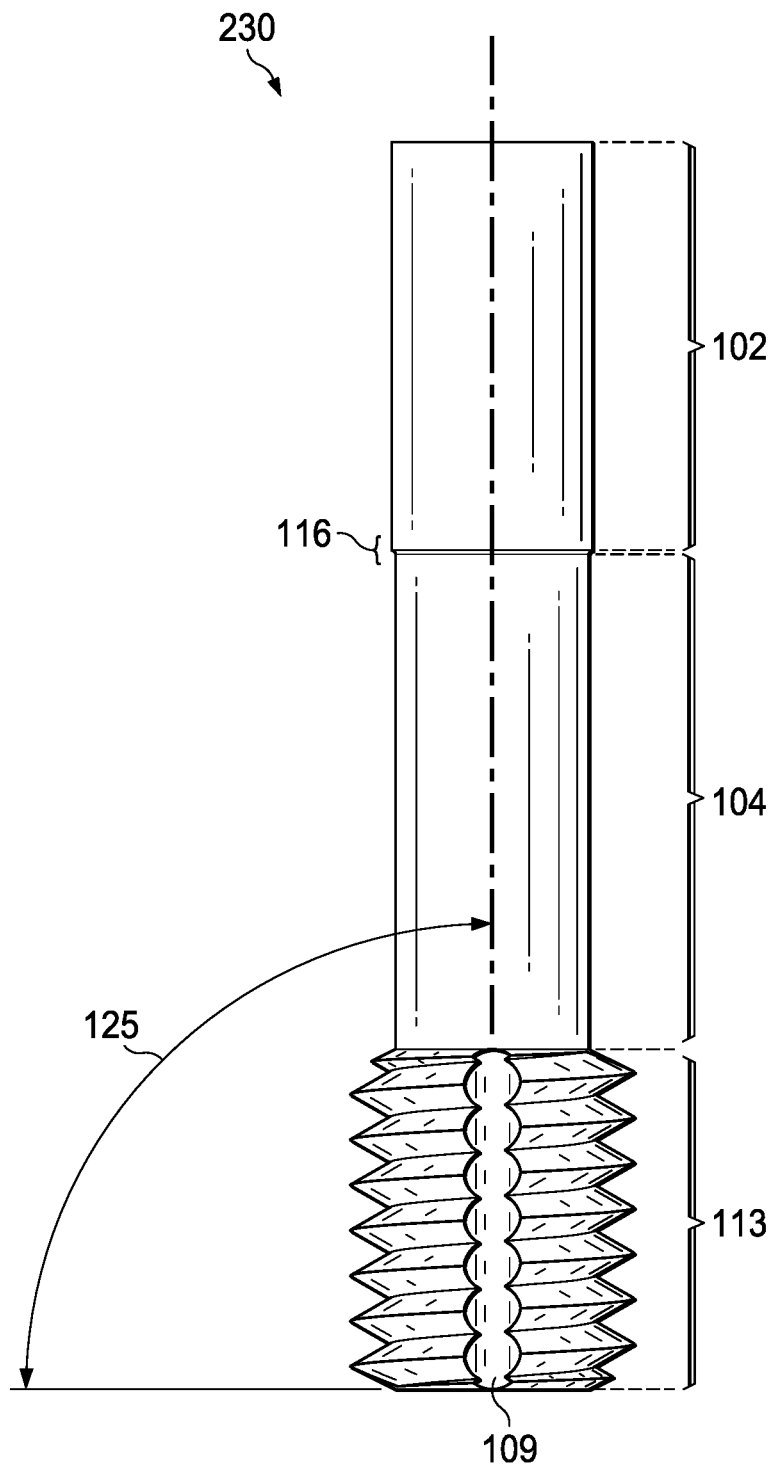
FIG. 1B is a side view of a chaser of a preferred embodiment.

Referring to FIG. 1B, an alternate embodiment, chaser 230, will be described. In this embodiment, threading section 113 is comprised of straight flute 109 with helix angle 225 of about 90°, ±2°.

Figure 1C:
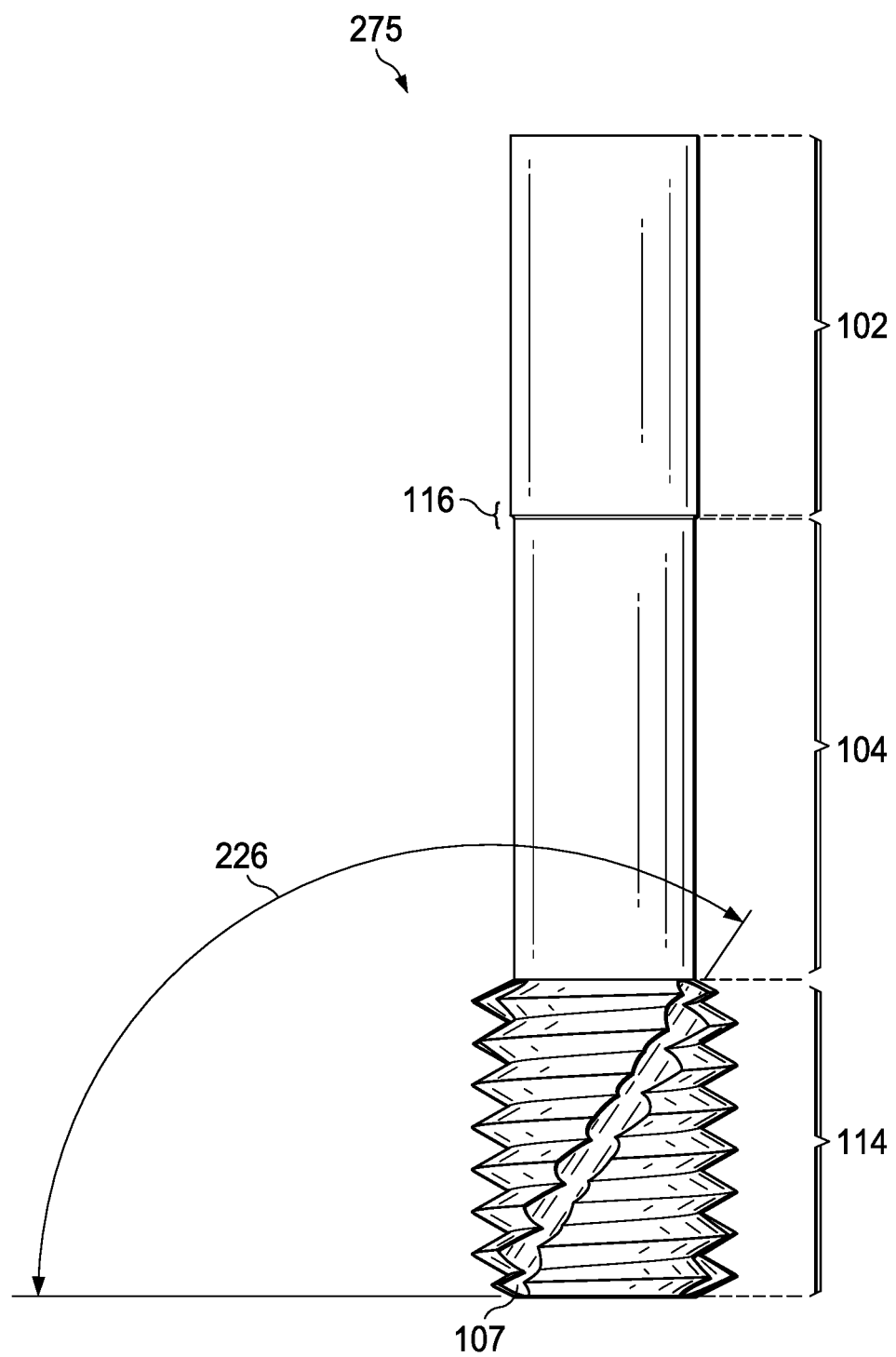
FIG. 1C is a side view of a chaser of a preferred embodiment.

Referring to FIG. 1C, an alternate embodiment, chaser 275, will be described. In this embodiment, spiral flute 107 of threading section 114 is a forward helix having helix angle 226 is about 120°, ±2° from the radial axis. The helix angle of about 120° has been discovered to be particularly useful in cleaning deep threads with aluminum or brass scoring where debris can be removed as properly spiraling chips.

Figure 2A:
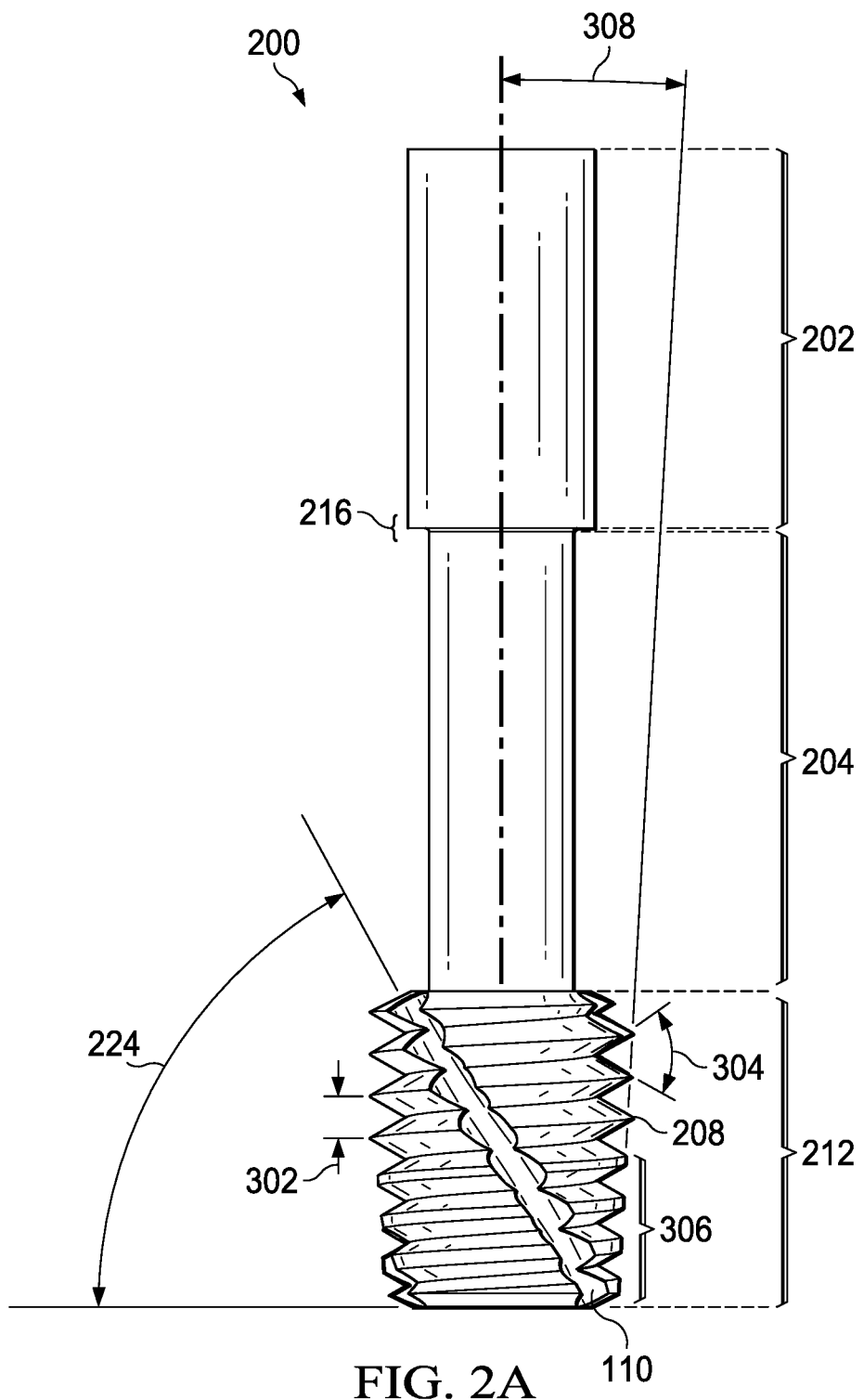
FIG. 2A is a side view of a tap of a preferred embodiment.

Referring to FIG. 2A, novel tap 200 will be described. Tap 200 includes receiver 202, frustroconical transition 216, shaft 204, and threading section 212. Receiver 202, frustroconical transition 216, shaft 204 and threading section 212 are integrally formed.

Receiver 202 is preferably cylindrical for reasons previously described. In a preferred embodiment, receiver 202 is approximately 0.6" long and about 0.5" in diameter, but other dimensions can be used based on bore hole diameter.

Frustroconical transition 216 extends from receiver 202 to shaft 204, in a preferred embodiment. Frustroconical transition 216 allows for a reduction in diameter between receiver 202 and shaft 204, as previously described.

Shaft 204 is located between frustroconical transition 216 and threading section 212. Shaft 204 is cylindrical in the preferred embodiment having a length of about 0.7" and a diameter of about 0.3". However, in alternative embodiments, the cross-section of the shaft may take different shapes such as hexagonal or square. The shaft may be of equal or lesser diameter than the diameter of the receiver. Preferably, the shaft is of lesser diameter to make way for chips ascending through the flutes during use.

Threading section 212 is connected to shaft 204. Threading section 212 includes cutting threads 208. Cutting threads 208 have thread angle 304 with pitch 302 and include lead taper section 306, as will be further described. In this embodiment, the tap section is about 0.5" in length. The length may vary.

Threading section 212 further comprises spiral flutes 110. In the preferred embodiment, there are three spiral flutes. In other embodiments, the number of spiral flutes can range from one to six.

The spiral flutes extend at a diagonal helix through the cutting threads at helix angle 224. In a preferred embodiment, the spiral flutes have a cross-section diameter of about 15% of the tap root diameter. However, the cross-sectional diameter can range from 10% to 30% of the root diameter. In the preferred embodiment, the helix angle is between 5° and 120°, ±5° from the radial axis. In one embodiment, the helix angle is about 60°, ±2° from the radial axis, which is a reverse helix, particularly effective for removal of chips in brittle materials with high Rockwell numbers. In use, a helix angle of about 60° provides extremely small chips which may easily be removed by flushing with a lubricating fluid. Further, in the preferred embodiment, the spiral flutes all have the same helix angle. However, the helix angle of the spiral flutes does not necessarily need to be the same.

In the preferred embodiment, the ratio of the length of receiver 202 to the length of shaft 204 to the length of threading section 212 is about 1:1.1:0.9. Other ratios may suffice, as previously described. The preferred length of the tap is about 1.8" to 2". Other lengths can be used. The ratios are important for the reasons previously described.

The tap is preferably integrally formed from case hardened carbon alloy steel having components of tungsten, chromium, vanadium, molybdenum and nickel with a carbon content of between 0.5% and 1.5%. HRC 58-60 hardness is preferred. In one embodiment, 4340 steel is preferred. In other embodiments, T1, T15, M2 or M48 is preferred. Oil quench is preferred.

Figure 2B:
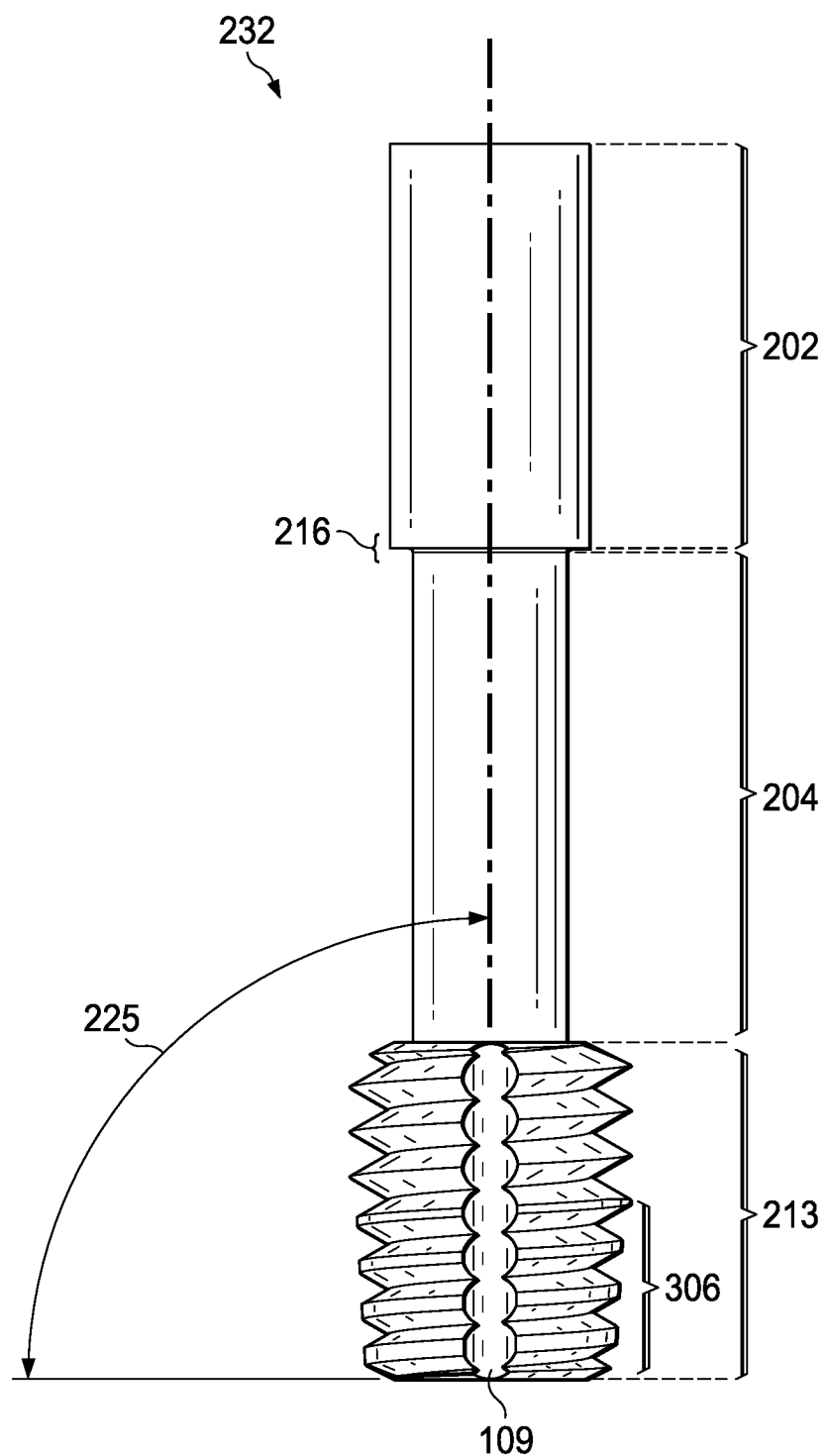
FIG. 2B is a side view of a tap of a preferred embodiment.

Referring to FIG. 2B, an alternate embodiment of tap 232 will be described. In this embodiment, threading section 213 includes lead taper section 306 and straight flute 109 with helix angle 225 which is about 90°, ±2° from the radial axis.

Figure 2C:
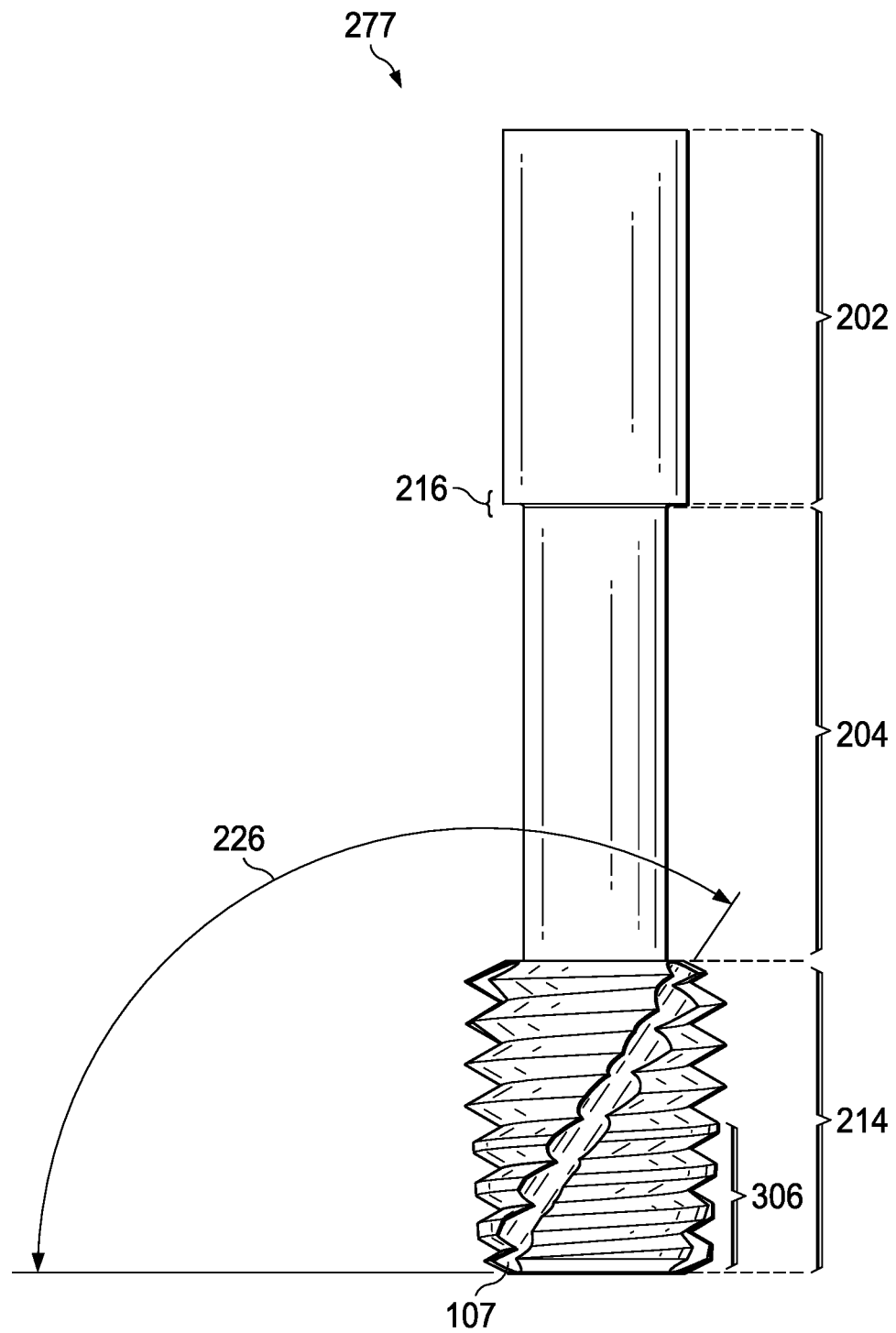
FIG. 2C is a side view of a tap of a preferred embodiment.

Referring to FIG. 2C, an alternate embodiment of tap 277 will be described. In this embodiment, threading section 214 includes lead taper section 306 and spiral flute 107 which is a forward diagonal helix having helix angle 226 of about 120°, ±2° from the radial axis. A helix angle of about 120° is particularly useful in ductile materials such as copper or aluminum where proper spiral chips are preferred.

Figure 3:
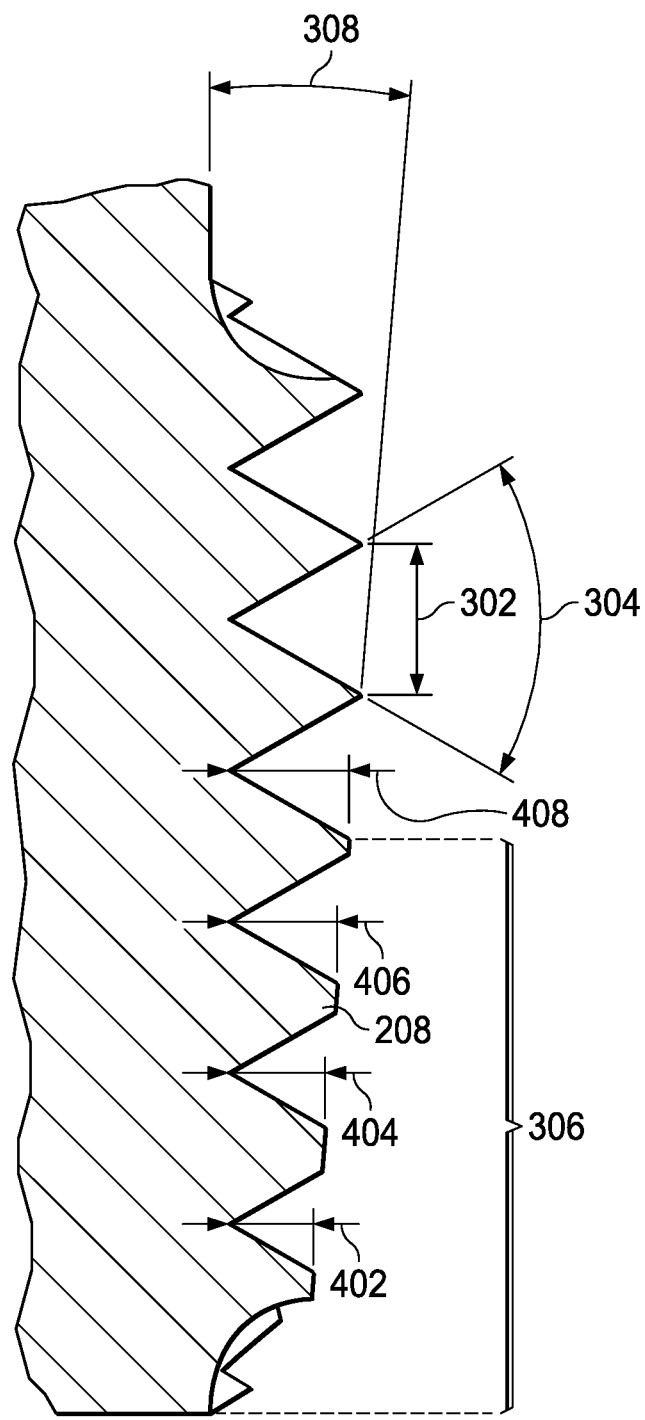
FIG. 3 is a side view of the cutting threads of a tap of a preferred embodiment.

Referring to FIG. 3, cutting threads 208 will be further described. Cutting threads 208 have a uniform thread angle 304 with pitch 302. In the preferred embodiment, the thread angle is about 60°. Other custom thread angles are possible. In the preferred embodiment, the pitch is 2.0 mm. In an alternative embodiment, the pitch is between 7 TPI and 16 TPI or between 2.5 mm and 1.0 mm. Other pitches may be used.

Cutting threads 208 further include lead taper section 306. In the lead taper section, the cutting threads sequentially reduced at lead taper angle 308. The cutting threads extend from the root to the lead taper angle such that thread depth 402, 404, 406 and 408 sequential increase as dictated by the lead taper angle. In the preferred embodiment, the lead taper angle is between about 10° and about 45°, ±2° from the longitudinal axis. In an alternate embodiment, the lead taper angle is about 10°, ±2° from the longitudinal axis.

Figure 4:
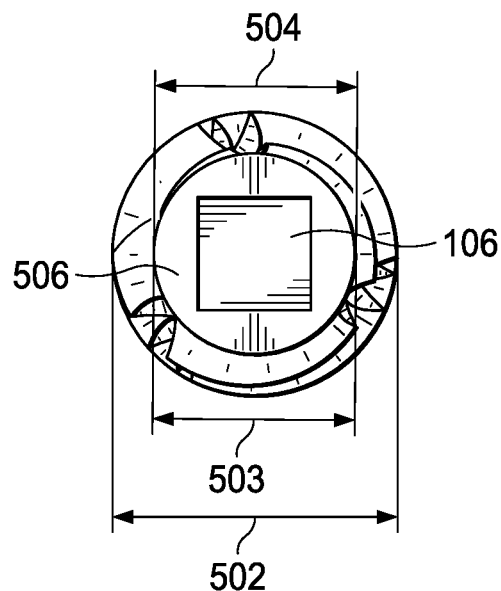
FIG. 4 is a plan view of a preferred embodiment.

Referring to FIG. 4, the receiver has tool face 506 with tool face diameter 504. The threading section has crest diameter 502 and root diameter 503. Critically, tool face diameter 504 is smaller than crest diameter 502 and root diameter 503. In a preferred embodiment, the tool face diameter is about 2% smaller than the root diameter to allow the tool face to pass into the bore hole and to align the receiver with the threads in the bore hole without distorting the threads or removing thread material.

Receiver 202 includes drive socket 106. In the preferred embodiment, drive socket 106 is a square indentation about 0.3" deep and is adapted to be fitted to a ⅛" or a ¼" ratchet drive head (not shown). In other embodiments, the drive socket may be adapted to be fitted with 3/16", ⅜" or larger ratchet drive heads. In alternative embodiments, drive socket 106 can have a spanner cross-section, or be adapted to fit a hex head driver. Spanner or hex head adaptations are preferable where less play is required between the driver and the tap, or where multiple extensions are employed. In other alternative embodiments, drive socket 106 can be any other shape that prevents axial rotation between the receiver to either a driver or an extension.

Figure 5:
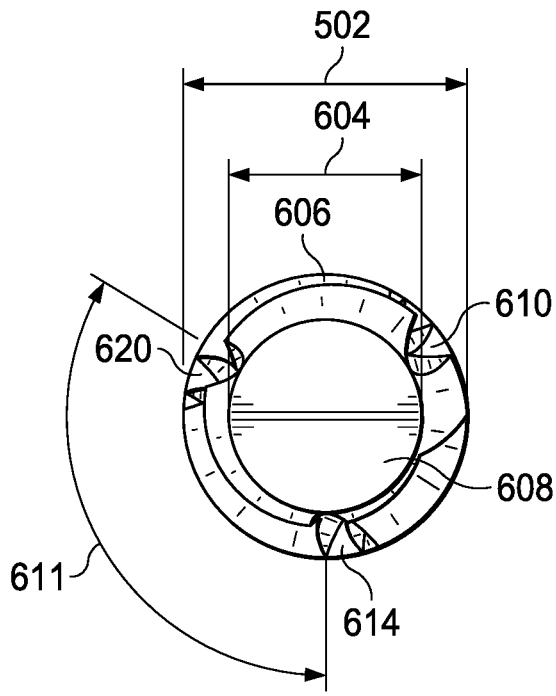
FIG. 5 is a bottom view of a preferred embodiment.

Referring to FIG. 5 the threading section will be further described. The threading section includes tool base 608 and land 606. The tool base is preferably flat. The cutting lands are the sections of the threads separated by the spiral flutes. The lands are the same for both the tap and the chaser embodiments.

The threads have spiral flutes 610, 614, and 620. In the preferred embodiment, the three spiral flutes are placed equidistant around cutting threads forming flute distribution angle 611 of approximately 120°, ±2° about the longitudinal axis of the tool. In other preferred embodiments, flute distribution angle 611 is between 30° and 180°, depending on the number of spiral flutes. At a 30° flute distribution angle, 12 spiral flutes are provided. At a 180° flute distribution angle, 2 spiral flutes are provided.

Spiral flutes 610, 614, and 620 each have a generally semicircular cross-section, as viewed along the longitudinal axis of the flute, as will be further described. In alternative embodiments, the spiral flutes have an oval cross-section whose major axis is tangential to the thread crest. In the preferred embodiment, the depth of the spiral flutes is approximately equal to the thread depth of the cutting thread. In alternate embodiments, the depth of the spiral flute is less than the thread depth of the cutting thread by about 5%. In another embodiment, the depth of the spiral flutes is greater than the thread depth of the cutting thread by about 5%. The greater depth of the spiral flutes in this embodiment is especially helpful in removing chips and debris by creating sufficient space for the chips or debris to gather and move upward without becoming entangled in the cutting threads. In the preferred embodiment, all the spiral flutes in each tap or chaser have the substantially same depth, diameter, and helix angle.

Figure 6:
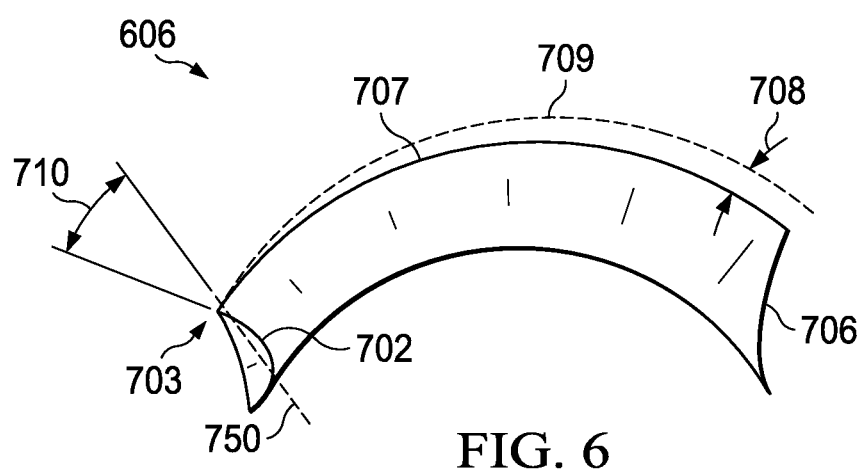
FIG. 6 is a detail view of a land of a preferred embodiment.

Referring to FIG. 6, exemplary land 606 will be further described. Land 606 is a land of the threading section of a tap, positioned between two spiral flutes, outside the lead taper section, or a typical land of the threading section of a chaser. Those of skill in the art will understand that the lands, cutting faces and heels are equally tapered by the lead angle in the lead taper section of a tap, but otherwise share the same characteristics as those outside the lead taper section. Exemplary land 606 has cutting face 702. Cutting face 702 advances into the material. Cutting face further comprises cutting tooth 703. The cutting tooth advances into the material as the leading point of the cutting face. Cutting face 702 further includes hook angle 710. The hook angle is the angle of attack for the cutting tooth. The hook angle maybe defined as an angle taken from tangent line 750 to the center of the cutting face. In the preferred embodiment, the hook angle is between about 3° and about 5°, ±0.3°. In another preferred embodiment, the hook angle is between about 0° and about 15°, ±0.3°. Heel 706 trails the cutting face as the tap advances into the material. The heel is typically a shallow concave curve having a diameter of about 1". Other reasonably diameters range from 0.3" to 1.2" may be used so long as the curve is concave. The curve of the heel prevents chip and debris build up as the tool advances into the material. Rake surface 707 is positioned between the cutting tooth and the heel. Rake surface 707 is positioned at rake angle 708. The rake angle is defined as the degree that the rake surface of the land is moved inward from the ideal thread crest diameter 709 with an apex at the position of the cutting tooth. The position of the rake surface at the rake angle is important to reduce the friction load on the teeth of the tap or the chaser as the cutting tooth and rake surface advance in the material. In one embodiment, the rake angle 708 is between about 2° and about 15°, ±2°, and preferably a reduced rake angle of about 8°, ±2°.

Figure 7:
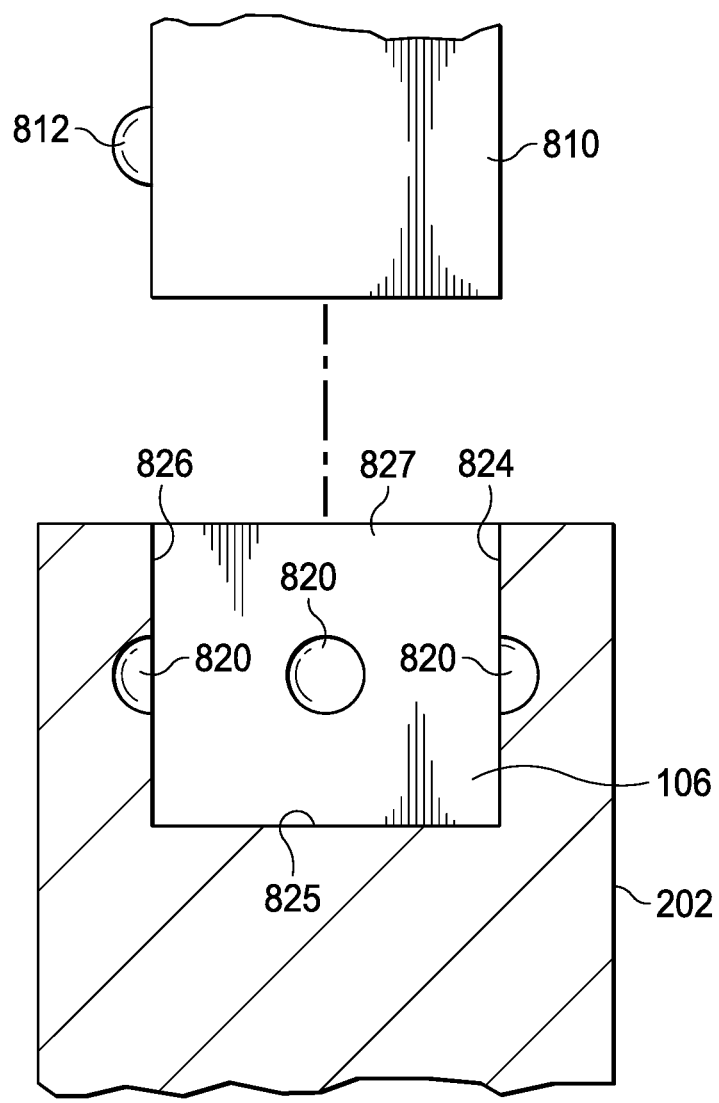
FIG. 7 is a cross-section view of a drive socket of a preferred embodiment.

FIG. 7 shows a cutaway view of a preferred embodiment of receiver 202. Receiver 202 includes drive socket 106. Drive socket 106 is bounded by side walls 824, 826 and 827 and bottom 825. Each sidewall includes centrally positioned recess 820. The recesses are preferably substantially semispherical and are adapted to receive spring loaded lock ball 812 of driver head 810. The recesses allow a secure physical connection between the receiver and the driver or extension.

Figure 8:
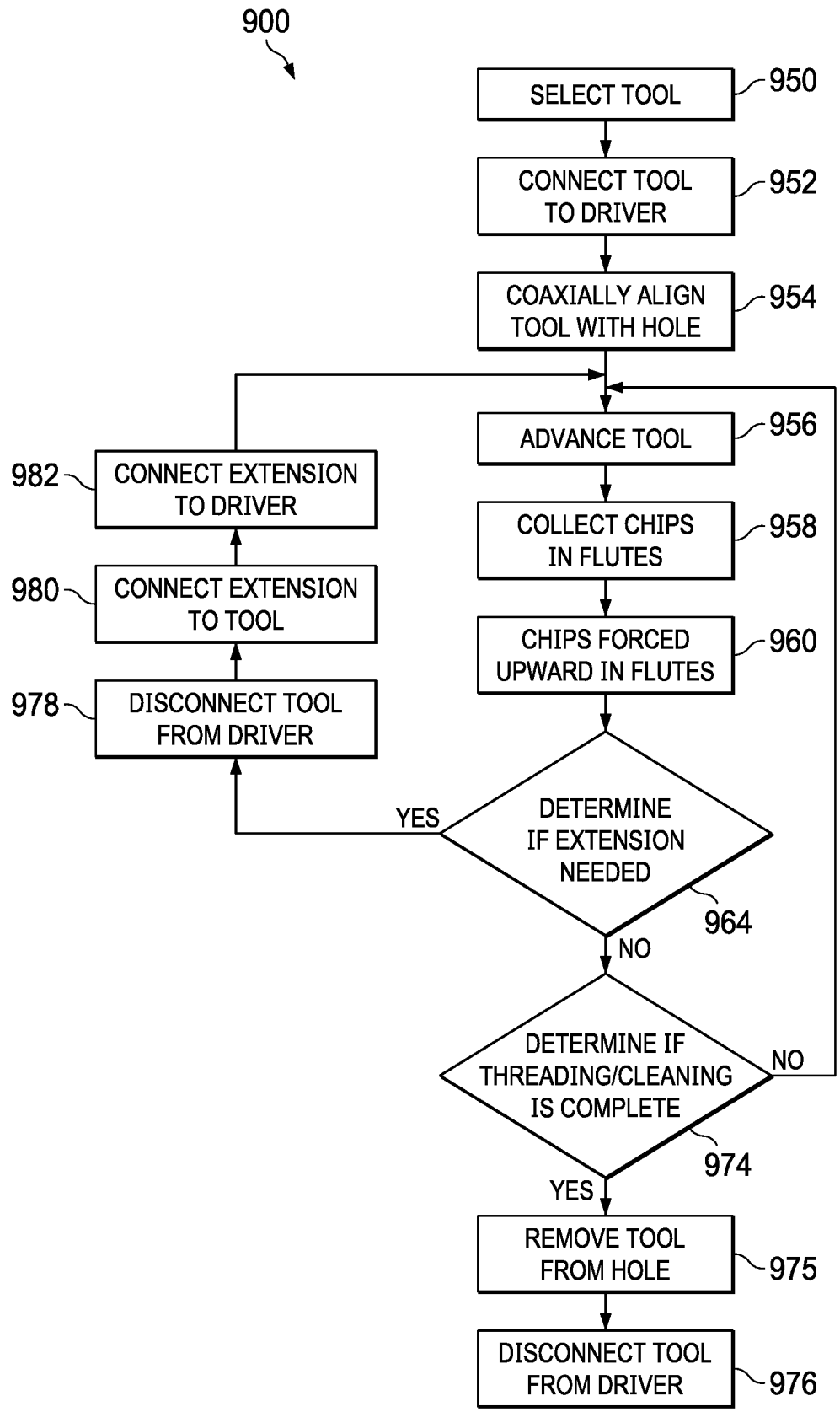
FIG. 8 is a flowchart of a preferred method of use.

Referring to FIG. 8, method 900 of use of the tap or chaser will be described.

At step 950, the diameter and thread pitch are selected.

At step 952, the tool is connected to a driver. A single ratchet or double handle ratchet driver is preferred, but other more typical t-handle tap drivers may also be used with a suitable adaptor. Those of skill will recognize that the ability to drive the tool with a common ratchet provides a distinct advantage over the prior art because it allows the tap to access holes in locations that are not possible to reach with a common t-handle tap driver and long shaft tap.

At step 954, the tool is inserted into the bore hole. The tool is initially axially aligned with the hole to prevent cross-threading.

At step 956, the driver rotates the tool. The rotation of the tool causes the cutting teeth and cutting faces of each land to advance into the hole cutting or cleaning threads. As the cutting faces advance, debris and other material are removed as chips. At this step, a suitable lubricant may be applied under pressure to the bore hole to aid in debris removal. The reduced rake angle reduces the contact area between the crest diameter of the tool threads and the root diameter of the bore hole threads, thereby reducing friction and the torque required to rotate the tool.

At step 958, the debris is collected in the spiral flutes ahead of the advancing cutting faces.

At step 960, the debris is forced upward in the spiral flutes. Forcing the debris away from the cutting faces allows for the tap to rotate longer before cleaning and create cleaner more precise threads.

At step 964, a determination is made as to whether or not a socket extension is required.

If so, then at step 978, the driver is disconnected from the tool. At step 980, an extension is connected to the tool. Those of skill will recognize the advantage of not needing to remove the tool from the bore hole to add the extension, thereby saving time and enhancing precision of the threads. It will also be recognized that the reduced diameter receiver is capable of entering the hole with the aid of the extension, thereby allowing the tool to cut or clean threads and clear debris efficiently from deep blind holes. It will further be recognized that the cylindrical surface of the receiver engages the crest diameter of many threads in the bore hole, and serves to maintain the alignment of the tool as it descends in the hole, thereby eliminating binding, reducing tool breakage and increasing the precision of the resulting threads.

At step 982, the extension is connected to the driver. The method then returns to step 956.

If not, then the method moves to step 974.

At step 974, a determination is made as to whether or not threading or cleaning is complete.

If so, then at step 975 the tool is removed from the hole. At step 976, the tool is disconnected from the driver. If not, the method returns to step 956.

It will be appreciated by those skilled in the art that the tool is designed to be used with English or metric threads, and to comply with ASME and ANSI standards. The tool may be used with other thread types, including pipe threads, and threads of custom depth, pitch and diameter by appropriately adapting the dimensions of the tool. Likewise, the preferred embodiments are described for use with right-handed threads. However, in special cases embodiments for use in cutting or cleaning left-handed threads are equally advantageous for the same reasons described. Likewise, other changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

The invention claimed is:
1. A tap comprising:
a receiver, with a first diameter, having a drive socket, a longitudinal axis and a radial axis;
a shaft section, with a second diameter, connected to the receiver, coaxial with the longitudinal axis;

a threading section, connected to the shaft section, coaxial with the longitudinal axis;

the threading section further comprising a set of longitudinal flutes with each longitudinal flute of the set of longitudinal flutes, forming a helix angle with the radial axis;

the threading section further comprising a set of threads having a crest diameter and a root diameter;

wherein the root diameter is greater than the first diameter and the second diameter; and wherein the receiver has a first length, the shaft section has a second length and the threading section has a third length;

wherein a ratio of the first length to the second length to the third length is between 1:2:1±10% and 1:0.5:1±10%.

2. The tap of claim 1, wherein the threading section further comprises:

a land, having a cutting face, perpendicular to the longitudinal axis; and, wherein the cutting face has a hook angle of between 0°±0.3° and 15°±0.3°.

3. The tap of claim 2, wherein the hook angle is between 3°±0.3° and 5°±0.3°.

4. The tap of claim 2, wherein the land further comprises a rake surface at a reduced rake angle.

5. The tap of claim 4, wherein the reduced rake angle is between 0°±2° and 15°±2°.

6. The tap of claim 4, wherein the reduced rake angle is between 2°±2° and 8°±2°.

7. The tap of claim 1, wherein the set of longitudinal flutes further comprises:

a set of three equally spaced longitudinal flutes at a 90°±2° helix angle from the radial axis.

8. The tap of claim 1, wherein the drive socket has a spanner cross-section.

9. The tap of claim 1, wherein the receiver has a first circular cross-section and the shaft section has a second circular cross-section.

10. The tap of claim 1, wherein the receiver, the shaft section and the threading section are oil quenched.

11. The tap of claim 1, wherein the set of longitudinal flutes further comprises three spiral flutes at a 120°±2° flute distribution angle.

12. The tap of claim 1, wherein the threading section is blunt ended.

13. The tap of claim 1, wherein the first diameter is larger than the second diameter.

14. The tap of claim 1, wherein the receiver, the shaft section and the threading section are carbon steel.

15. The tap of claim 1, wherein the receiver, the shaft section and the threading section are cylindrical.

16. The tap of claim 1, wherein the first diameter is between 2%±5% and 20%±5% less than the root diameter.

17. The tap of claim 1, wherein the threading section further comprises:

the set of threads includes at least a top thread and a bottom thread; and the top thread directly connected to and engaging the shaft section, coaxial with the longitudinal axis;

wherein the second diameter is constant from the top thread to the receiver.

* * * * *